United States Patent [19]

Iovine et al.

[11] Patent Number: 4,775,706

[45] Date of Patent: Oct. 4, 1988

[54] WATER-RESISTANT ALKALINE ADHESIVE COMPOSITION

[75] Inventors: Carmine P. Iovine, Bridgewater; Robert H. Williams, Somerville; Craig H. Leake, Edison, all of N.J.

[73] Assignee: National Starch and Chemical Corporation, Bridgewater, N.J.

[21] Appl. No.: 868,508

[22] Filed: May 30, 1986

[51] Int. Cl.$^4$ ............................ C08J 3/10; C08L 3/04; C08L 61/02
[52] U.S. Cl. ........................................ 524/47; 524/28; 524/44; 524/55; 524/445; 156/326; 156/327; 156/328; 156/336
[58] Field of Search ...................... 524/44, 47, 55, 28, 524/445; 156/326, 327, 328, 336

[56] References Cited

U.S. PATENT DOCUMENTS

| | | | |
|---|---|---|---|
| 2,102,937 | 12/1937 | Bauer | 156/328 |
| 3,095,390 | 6/1963 | Maeder | 526/292.2 |
| 3,678,098 | 7/1972 | Lewis et al. | 526/292.2 |
| 4,366,275 | 12/1982 | Silano et al. | 524/47 |
| 4,424,291 | 1/1984 | Leake et al. | 524/47 |
| 4,444,971 | 4/1984 | McEntire | 526/292.2 |
| 4,489,192 | 12/1984 | Shih et al. | 524/813 |

*Primary Examiner*—John Kight
*Assistant Examiner*—Nathan M. Nutter
*Attorney, Agent, or Firm*—Royal N. Ronning, Jr.; Edwin M. Szala

[57] ABSTRACT

A starch-based alkaline curing adhesive is disclosed. The adhesive, when employed in the preparation of corrugated paperboard provides the paperboard with superior water resistant bonds. The adhesive contains from about 6 to 35%, based on total weight of the adhesive, solids basis, of a latex polymer of a halohydrin quaternary ammonium monomer.

19 Claims, No Drawings

WATER-RESISTANT ALKALINE ADHESIVE COMPOSITION

BACKGROUND OF THE INVENTION

This invention relates to a starch-based, alkaline adhesive composition, a process for preparing corrugated paperboard using the adhesive composition, and the corrugated paperboard product produced thereby. The adhesive of the present invention may be used to provide formaldehyde-free corrugated paper products which are water resistant.

As used herein the term "corrugated paperboard" refers to a fluted medium and a facing adhesively joined to the tips on one or both sides of the fluted medium.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use of operation of corrugators in general are described in U.S. Pat. Nos. 2,051,025 and 2,102,937 issued on Aug. 18, 1936 and Dec. 21, 1937, respectfully to Bauer.

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

The most fundamental of starch corrugating adhesives is an alkaline adhesive which is comprised of raw ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formation adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, has been added to the adhesive as a crosslinking additive for the amylaceous components to produce water-resistant bonds.

In recent years, due to the uncertainty of the safety of formaldehyde, efforts have been made to reduce the levels of exposure to formaldehyde in the industrial workplace. U.S. Pat. No. 4,400,480 issued on Aug. 23, 1983 to M. Silano et al. employs an acetone-formaldehyde condensate crosslinking additive low in free formaldehyde in an alkaline curing corrugating adhesive.

The corrugating industry is still searching for means for providing water resistance to corrugated paperboard products prepared from alkaline curing starch-based adhesives which are formaldehyde-free.

Accordingly, it is an object of the present invention to provide a water-resistant alkaline starch-based adhesive composition in the manufacture of corrugated paperboard which is formaldehyde-free.

SUMMARY

The above and related objectives are achieved by replacing all or a portion of the gelatinized starch in the carrier portion of an alkaline starch-based corrugating adhesive composition, with a latex polymer which comprises halohydrin quaternary ammonium units of the formula:

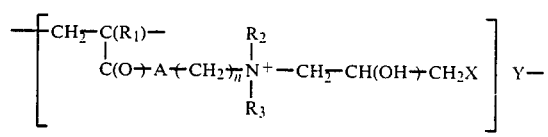

where
$R^1$ is hydrogen or a methyl group;
A is —O— or

with $R_4$ being hydrogen or a $C_1$–$C_3$ alkyl group; $R_2$ and $R_3$ are independently $C_1$–$C_6$ alkyl groups;
X is a halogen;
Y is an anion; and
n is 1–4.

Thus, a water-resistant, alkaline curing adhesive of this invention comprises:

A. from about 6–35%, based on total weight of the adhesive, solids basis, of the polymer described herein in latex form;

B. from about 10–50%, based on total weight of the adhesive, of starch, this including the ungelatinized as well as the gelatinized portions of the starch;

C. from about 40–80%, based on total weight of the adhesive, of water; and

D. sufficient alkali to provide the adhesive with a pH of about 7.5 to 13.

This invention further relates to a process for preparing corrugated paperboard by adhesively bonding a facing to a fluted paper strip comprising the steps of (a) applying the adhesive composition above described to the tips of the corrugations of a fluted paper strip and (b) pressing a facing onto the adhesive-coated tips of the fluted paper strip to form an adhesive bond.

DESCRIPTION OF THE PREFERRED EMBODIMENTS

The starch component of the adhesive composition herein, which may be wholly ungelatinized or consist of both gelatinized and ungelatinized starch portions may be selected from any of the several starchs, native or converted, heretofore employed in starch corrugating adhesive compositions. Suitable starches include, for example, those starches derived from corn, potato, waxy maize, sorghum, wheat, as well as high-amylose starches, i.e., starches which contain 50% or more by weight of amylose, and the various derivatives of these starches. Hence, among the applicable starches are included in the various starch derivatives such as ethers, esters, thin-boiling types prepared by known processes such as mild acid treatments, oxidation, etc. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10–50% by total weight of the adhesive. In compositions where gelatinized starch is employed in addition to ungelatinized starch, the total starch content of the adhesive will typically range from about 25 to 50%. In compositions where no gelatinized starch is employed, ungelatinized starch will be present in amounts ranging from about 10 to 30%.

The alkali (base) employed herein is preferably sodium hydroxide; however, other bases may be employed in partial or full replacement of the sodium hydroxide and include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali is preferably employed in aqueous form in amounts sufficient to provide the adhesive with a pH of about 7.5 to 13, and preferably 10 to 13.

The latex polymer herein is derived at least in part from a halohydrin quaternary ammonium ester or amide monomer having the formula:

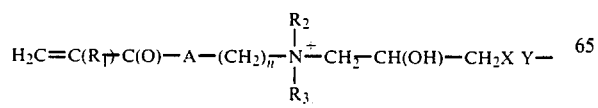

where
R$_1$ is hydrogen or a methyl group;
A is —O— or

with R$_4$ being hydrogen or a C$_1$–C$_3$ alkyl group; R$_2$ and R$_3$ are independently C$_1$–C$_6$ alkyl groups;
X is chlorine, bromine, or iodine;
Y is an anion; and
n is 1–4.

The monomer(s) are preferably employed in the latex polymer in amounts ranging from about 0.5–10%, and most preferably 1–4%, by weight. Mixtures of two or more of such polymers may also be utilized. The typical amount of latex polymer employed ordinarily will be in the range of about 6 to 35% (solids basis) and preferably between 10 and 25% based on the total weight of the adhesive.

The halohydrin monomers are quaternary ammonium compounds prepared by reacting an epihalohydrin, preferably epichlorohydrin, with a suitable amine. Typically the anion is Cl$^-$, Br$^-$, RCO$_2^-$, NO$_3^-$, SO$_4^{--}$, CH$_3$SO$_3^-$, or a like anion derived from inorganic or organic acids.

The cationic ester monomer may be prepared according to the procedure described in U.S. Pat. No. 3,678,098 issued July 18, 1972 to Sheldon N. Lewis et al., the disclosure of which is incorporated herein by reference. An epihalohydrin is reacted under acid conditions with the hydrogen acid salt of a basic ester of the formula

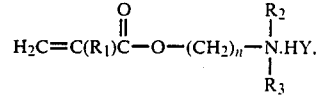

wherein R$_1$, R$_2$, R$_3$, Y and n, are as defined hereinabove. The reaction is carried out at from ambient temperature to 80° C., preferably 50° C. or less, in an aqueous medium. The epihalohydrin, used in at least a stoichimometric amount, is generally added to the aqueous salt solution. It is essential to maintain the pH on the acid side to avoid side reactions. A polymerization inhibitor (e.g. monomethyl ether of hydroquinone, hydroquinone, or phenothiazine) may be used. The monomers obtained may be stored in solution in the aqueous reaction medium, concentrated or even isolated by vacuum vaporization of the water.

The cationic amide monomer may be prepared according to the procedure of U.S. Pat. No. 3,095,390 issued June 25, 1963 to A. Maeder, the disclosure of which is incorporated herein by reference. It is prepared using the above procedure except that the hydrogen acid salt of a suitable basic amide is used. The salt will have the formula

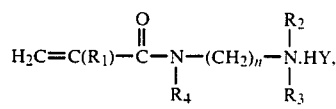

wherein R$_1$, R$_2$, R$_3$, R$_4$, Y and n are as defined above.

The latex polymers useful herein typically are copolymers of the above halohydrin monomers with one or more vinyl polymerizable monomers. These include monomers such as esters of (meth)acrylic acid with $C_1$-$C_{18}$ alcohols, including $C_1$-$C_{18}$ alkanols, benzyl alcohol, cyclohexyl alcohol, and isobornyl alcohol, such as methyl, ethyl, butyl, 2-ethylhexyl, or octadecylacrylate or methacrylate; (meth)acrylamide and their N-substituted derivatives, such as N-mono- and N-dimethyl, -ethyl, -propyl, and -butyl acrylamide or methacrylamide and N-mono- or diphenylacrylamide; vinyl ethers such as butyl vinyl ether; N-vinyl latacms such as N-vinyl pyrrolidinone; halogenated vinyl compounds such as vinyl chloride and vinylidene chloride or fluoride; alkyl vinyl ketones such as methyl or ethyl vinyl ketone; diesters of $\alpha,\beta$-unsaturated dicarboxylic acids such as dimethyl, diethyl, dipropyl, dibutyl, diphenyl, dibenzyl, and di(phenylethyl) itaconate, maleate, and fumarate; (meth)allyl esters of saturated aliphatic monocarboxylic acids such as allyl and methallyl acetates, propionates, and valerates; other vinyl compounds such as vinyl pyrrole, styrene, vinyl toluene, and $\alpha$-methyl styrene; and olefins such as ethylene. The comonomers may be used in amounts up to about 99.5% by weight. The preferred comonomers are ethyl acrylate, 2-ethylhexyl acrylate, vinyl acetate, butyl acrylate, methyl methacrylate and styrene. Minor amounts (e.g. 0.05–0.5%) of crosslinking monomers such as diallyl maleate, triallyl cyanurate, and tetraethylene glycol diacrylate are also useful herein. Carboxylic acid-containing monomers including, for example, (meth)acrylic acid are also useful herein in amounts up to about 5%, by weight. Larger amounts of these monomers provide alkali-swellable and/or alkali soluble polymers which are unsuitable for use in the alkaline-curing adhesive formulations herein.

The latex polymers may be prepared by employing typical emulsion polymerization techniques which include the use of conventional initiators or redox systems and nonionic or cationic emulsifiers (surfactants) which are described in U.S. Pat. Nos. 3,678,098 and 3,095,390 (cited previously) and U.S. 4,489,192 to Y. Shih et al. issued Dec. 18, 1984, the disclosure of which is also herein incorporated by reference. The polymers typically have an intrinsic viscosity (I.V.) of at least about 0.5 dl./g. measured in tetrahydrofuran, and preferably have an I.V. of about 1 to 3.

Depending on the ultimate application of the adhesive herein, a thermosetting resin may be added to further enhance the water resistance thereof. Typical thermosetting resins useful in the present invention when residual formaldehyde is not a concern include for example, ketone-formaldehydes (e.g., acetone-formaldehyde), melamine-formaldehyde and urea formaldehyde. Generally, the resins are added in amounts ranging from 1 to 10%, by weight, based on adhesive solids.

In addition to the four essential ingredients of the adhesive composition of this invention, any conventional non-chemically functional additives may be incorporated into the adhesive in minor amounts, if desired. Such additives include, for example, preservatives; defoamers; wetting agents; plasticizers; solubilizing agents; rheology modifiers; water conditions; penetration control agents; peptizers such as urea; gelatinization temperature modifiers; inert fillers such as clay and finely ground polymers; thickeners such as inorganic collodial clays, guar, hydroxyethyl cellulose, alginates, polyvinyl alcohol, polymers of ethylene oxide and the like; tackifiers such as boron-containing salts (e.g., borax); and emulsions such as polyvinyl acetate.

In preparation of the adhesive compositions of this invention, there are several different ways in which the ingredients can be added depending, for example, on the adhesive solids desired, the equipment available, and whether or not gelatinized starch is present in the composition. In adhesives where gelatinized starch is employed, the starch is typically gelatinized in water with caustic soda and then slowly added to a slurry of raw starch and water. The latex polymer may be added to the raw starch mixture or to the final adhesive mixture as desired. In adhesives without a gelatinized starch component, application onto the fluted tips may be improved by the addition of thickeners such as those described above. Such adhesives are typically prepared by dissolving the thickener in water and thereafter adding the raw starch, latex polymer, and alkali or mixtures thereof to the thickened dispersion. The order of addition of the adhesive components is not critical to the water resistance exhibited.

The adhesives herein can be used to bond single- or double-faced boards using any equipment which is presently employed for the preparation of corrugated board. Thus, the adhesive is usually maintained at a temperature of between 21° and 43° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board ay be subsequently prepared by bringing a second facing in contact with the open fluted surface of the single-faced board by the usual procedures.

Any of various paperboard substrates may be utilized in combination with the adhesive composition of the present invention in order to provide corrugated paperboard. As the corrugating adhesive of the present invention provides water resistant properties, it is usually desirable to utilize a water resistnat paperboard in combination with the adhesive in order to provide a water resistant corrugated paperboard product. One preferred paperboard product is a wax impregnated paperboard, however, any of the various water resistant paperboard products such as, e.g., resin impregnated paperboard, may be utilized in combination with the water resistant adhesive of the present invention.

The examples which follow illustrate specific embodiments of the invention. In the examples all parts and percentages are given by weight and all temperatures in degrees Celsius unless otherwise noted. Intrinsic viscosities were determined in tetrahydrofuran.

EXAMPLE 1

This example illustrates the preparation of a typical latex polymer useful herein prepared from ethyl acrylate (EA), 2-ethylhexyl acrylate (EHA) and the halohydrin quaternary ammonium amide monomer described below.

Part A—Preparation of Amide Monomer

A 12-l reactor equipped with a thermometer, agitator, addition funnel, and condenser was charged with 2968 g. water and 3060 g. N,n-dimethylaminopropyl methacrylamide (DMAPMA). The solution was cooled to 20°

C. and 1820 g. of concentrated hydrochloric acid were added slowly over 2 hr. while maintaining the temperature below 30° C. Then 1332 g. epichlorohydrin (EPI) were added slowly over 2.5 hr. while maintaining the temperature at 30°-35° C. The solution was held overnight and then adjusted to pH 4-4.5 with hydrochloric acid. The unreacted EPI was removed by vacuum stripping at 63°-68° C. and the distillate was replaced with the same amount of water during stripping.

The resulting DMAPMA-EPI solution (~53% solids) contained a minor portion of the amine hydrochloride salt of DMAPMA and a major portion (~67%) of the quaternary ammonium salt adduct of DMAPMA and EPI which has the formula:

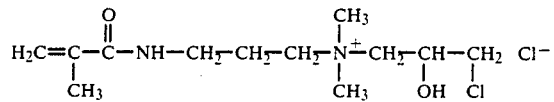

Part B—Preparation of the Latex Polymer

A 2 liter four neck flask was fitted with a thermometer, condenser, agitator, subsurface nitrogen purge, and suitable addition funnels. The following charges were prepared:

A—4.1 g. 70% octylphenol with 30 moles ethylene oxide (EO), 5.4 g. 100% octylphenol with 4 moles EO, 0.036 g. $FeSO_4\cdot7H_2O$, 0.07 g. t-butyl hydrogen peroxide (70%) in 30 g. water adjusted to a pH of 4 with acetic acid B—30 g. EA C—0.07 g. sodium formaldehyde sulfoxylate (SFS) in 3 g. water D—510 g. EA. 60 g. EHA, emulsified in a mixture of 126 g. water, 39. g. 70% octylphenol with 30 moles EO, 3 g. 100% octylphenol with 4 moles EO and 36.1 g. DMAPMA-EPI monomer solution of Part A.

E—0.7 g. t-butyl hydrogen peroxide (70%) in 24 g. water

F—0.7 g. SFS in 24. g. water

G—0.6 g. t-butyl hydrogen peroxide (70%) in 6 g. water

H—0.6 g. SFS in 6 g. water

The initial charge was added to the flask, agitation was started, and the mixture was purged subsurface with nitrogen for 60 minutes. Charge B was added. The mixture was heated to 30° C. then Charge C was added. The mixture was heated to 55° C. Thereafter Charges D, E, and F were added uniformly over 4.5 hours. The mixture was maintained at 55° C. for 15 minutes then additional initiator solution G was added over 15 minutes. After 5 minutes holding Charge H was added over 15 minutes. The batch was then held for 15 minutes, cooled to room temperature and filtered. The resulting EA/EHA/DMAPMA-EPI (87.4/9.7/2.9) latex polymer A (60% solids) had an I.V. of 2.7.

EXAMPLE 2

Polymers designated B-N were prepared employing the emulsion polymerization technique of Example 1 with the following additional monomers: methylemthacrylate (MMA), styrene (S), butyl acrylate (BA), vinyl acetate (VA), methacrylamidopropyltrimethyl ammonium chloride (MAPTAC), 3-chloro-2-hydroxypropyl methacrylate (CHPM), tetraethyleneglycol diacrylate (TEGDA), and diallymaleate (DAM). The data may be found in Table I.

EXAMPLE 3

This example illustrates the preparation of a typical corrugating adhesive which employes gelatinized starch in the carrier portion of the adhesive.

Preparation of Carrier Starch

To 379 l. (100 gal.) of water is added 181 kg. (400 lb.) of a high amylose corn starch (about 70% amylose by weight) and the resultant slurry is heated to 55° C. with agitation. About 19 l. (5 gal.) water containing 15 kg. (32 lb.) sodium hydroxide is then added to the slurry and mixing is continued for about 15 minutes. At the end of this period, about 379 l. (100 gal.) of water is added to cool and dilute the resultant dispersion.

Preparation of Full-Formation Adhesive

The carrier starch dispersion above prepared is added to a slurry of 635 kg. (1400 lb.) corn starch, 11 kg. (24 lb.) borax ($Na_2B_4O_7\cdot5H_2O$) and about 1136 l. (300 gal.) of water.

EXAMPLE 4

This example illustrates the water-resistant properties of bonds formed with the corrugating adhesives representative of this invention.

Adhesive samples were prepared by mixing 66-100 parts of the adhesive described in Example 3 with 0—34 parts (as is) of the latex polymers of Table I. The adhesives were employed in the preparation of a double-faced bond in corrugated paperboard via the following method which simulates conditions on the double-back section of a corrugator.

Each adhesive was applied at 6 mil thickness by a Bird applicator to a glass plate and was transferred to sheets of single-face web (of 62 lb. 1000 ft.$^2$ (0.302 kg./m.$^2$) wet strength liner and 30 lb./1000 ft.$^2$ (0.146 kg./m.$^2$) wet strength medium) by means of direct hand pressure. The single-face samples were then placed on top of 62 lb./1000 ft.$^2$ (0.302 kg./m.$^2$) wet strength liner and the resultant double-faced board was bonded at 0.25 psi on a hot plate at 177° C. for 4 seconds.

TABLE I

| Polymer | Composition | % Solids | I.V. dl./g. | Theoretical Tg. °C. |
| --- | --- | --- | --- | --- |
| A | 87.4 EA/9.7 EHA/2.9 DMAPMA—EPI | 60 | 2.7 | −26 |
| B (comparative) | 90 EA/10 EHA | 60 | 2.6 | −26 |
| C | 85 EA/9.4 EHA/5.6 DMAPMA—EPI | 60 | 1.8 | −26 |
| D (comparative) | 88.2 EA/9.8 EHA/2 MAPTAC | 59 | 2.6 | −26 |
| E | 96.8 EA/0.3 TEGDA/2.9 DMAPMA—EPI | 58 | 1.8 | −22 |
| F | 5.8 EA/34 S/57.3 BA/2.9 DMAPMA—EPI | 53 | 1.3 | −20 |
| G (comparative)* | 50 EA/50 MMA | NA | NA | +28 |
| H (comparative)* | 45.5 EA/45.5 MMA/9 CHPM | 34 | 0.5 | +28 |
| I | 47.2 EA/47.2 MMA/5.6 DMAPMA—EPI | 60 | 2.2 | +25 |
| J | 38.8 EA/58.2 MMA/3 DMAPMA—EPI | 58 | 1.5 | +40 |

TABLE I-continued

| Polymer | Composition | % Solids | I.V. dl./g. | Theoretical Tg. °C. |
|---|---|---|---|---|
| K | 37.7 EA/56.6 MMA/5.7 DMAPMA—EPI | 58 | 1.5 | +40 |
| L | 36.7 EA/55 MMA/8.3 DMAPMA—EPI | 59 | 2.2 | +40 |
| M | 26.2 EA/70.9 MMA/2.9 DMAPMA—EPI | 58 | 0.7 | +60 |
| N | 52.6 VA/43.1 BA/0.14 DAM/4.3 DMAPMA—EPI | 48 | 1.2 | −18 |

NA — not available

*Mixed nonionic/anionic surfactant system of 70% octylphenol with 30 mol EO and disodium salt of half ester of sulfosuccinic acid derived from $C_{10}$-$C_{12}$ ethoxylated alcohol was employed in the latex polymer preparation with sodium persulfate initiator.

The bonded boards were then placed in a conditioning atmosphere of 22° C., 50% relative humidity for 24 hours, after which 2×4 inch samples of each of the boards were placed in water at 22° C. for 24 hours.

At the end of this period the samples were evaluated by a wet pin adhesion test based on that of the TAPPI Standard UM 802 (formerly R 337) using a Hinde and Dauch Crush Tester obtainable from Testing Machines Incorporated, Mineola, N.Y. The test results were recorded in pounds (per 8 inches of glue line) at the point of initial bond failure of the double-face liner from the single-face web. The results are indicated in Table II with the highest values representing the best results.

TABLE II

| % Latex Polymer in Adhesive* | Polymer Composition | Wet Pin Adhesion (lbs./8 in.²) |
|---|---|---|
| 0% (Control) | — | 2 |
| 17% B (Comparative) | EA/EHA | 0 |
| 17% D (Comparative) | EA/EHA/MAPTAC | 0 |
| 3% C | EA/EHA/DMAPMA—EPI | 2 |
| 12% C | EA/EHA/DMAPMA—EPI | 13 |
| 17% C | EA/EHA/DMAPMA—EPI | 17 |
| 15% F | EA/S/BA/DMAPMA—EPI | 13 |
| 17% N | VA/BA/DAM/DMAPMA—EPI | 6 |
| 20% A | EA/EHA/DMAPMA—EPI | 34 |
| 20% E | EA/TEGDA/DMAPMA—EPI | 15 |
| 20% G (Comparative) | EA/MMA | 5 |
| 20% H (Comparative) | EA/MMA/CHPM | 4 |
| 34% I | EA/MMA/DMAPMA—EPI | 22 |

*Carrier starch of adhesives employing Polymers A, E, G, and H was Vinamyl ® II (a modified high amylose starch obtained from National Starch and Chemical Corp.)

The results show that adhesives which contained latex polymers with the halohydrin quaternary ammonium mer unit exhibited water resistance. Also, as the amount of a given polymer of the present invention is increased in the adhesive composition (i.e., Polymer C), greater water resistance is obtained.

A comparative polymer (D) containing a quaternary ammonium mer unit without halohydrin functionality was shown to provide no improvement in water resistance in comparison to similar Polymer B which did not contain the mer unit.

It was also shown that comparative Polymer H which contained a less reactive halohydrin mer unit provided no improvement in water resistance over similar Polymer G which did not contain the mer unit.

EXAMPLE 5

This example illustrates the preparation of corrugating adhesives containing no gelatinized starch carrier which employ latex polymers of the invention. This example also illustrates the effect the halohydrin quaternary ammonium monomer content of the latex polymer has no water resistance of the adhesive.

The formulation of the adhesive was as follows:

| Ingredient: | Amount: |
|---|---|
| Water | 176 g. |
| Guar Gum | 1 g. |
| Defoamer | 0.1 g. |
| Latex Polymer (as is) | 147 g. |
| Corn Starch | 176 g. |
| 5% Aqueous NaOH | 25–41 g. |

The adhesives were prepared by first dissolving the guar gum in the water. Thereafter a mixture of the starch and latex polymers J, K, or L was added to the guar solution with the defoamer. Lastly, sufficient aqueous sodium hydroxide was added to adjust the pH of the adhesives to 12.

The adhesives were evaluated as described in Example 4 with the exception that only a 3 mil thickness of each adhesive was employed. The results are indicated in Table III.

TABLE III

| Polymer Latex in Adhesive | % DMAPMA—EPI Adduct in Polymer | Wet Pin Adhesion (lbs./8 in.²) |
|---|---|---|
| J | 1.9 | 22 |
| K | 3.7 | 27 |
| L | 5.5 | 29 |

EXAMPLE 6

Two adhesive samples were prepared according to the procedure of Example 5 employing Polymer A and either corn or tapioca starch. The wet pin adhesion values for each sample (applied as a 6 mil thickness) were 22 and 20 lbs./8in.², respectively.

EXAMPLE 7

An adhesive sample was prepared according to the procedure of Example 5 employing Polymer M, an EA/MMA/DMAPMA-EPI polymer latex. The wet pin adhesion value for this sample (applied as a 3 mil thickness) was 23 lbs./8 in.².

EXAMPLE 8

This example illustrates the effect of pH on the water resistance of the adhesives herein. Adhesives were prepared and evaluated as in Example 5 employing a latex polymer having the composition of sample Polymer J with an I.V. of 0.9 dl./g. The amount of aqueous sodium hydroxide employed was varied to provide a series of adhesives ranging in pH from 7.5 to 12. The Wet Pin Adhesion values may be found in Table IV.

TABLE IV

| pH of Adhesive | Wet Pin Adhesion (lbs./8 in.$^2$) |
| --- | --- |
| 7.5 | 12 |
| 8 | 14 |
| 9 | 12 |
| 10 | 16 |
| 12 | 17 |

The results show that water resistance was obtained at pH 7.5; however optimum water resistance was achieved at pH's of 10 and above.

EXAMPLE 9

Adhesive samples containing 7.8–18.4% of Polymer A solids, based on total weight of the adhesive, were prepared and evaluated according to Example 5. The results are indicated in Table V.

TABLE V

| % Polymer Solids in Adhesive | % Polymer Solids based on Starch | Wet Pin Adhesion (lbs./8 in.$^2$) |
| --- | --- | --- |
| 7.8 | 20% | 12 |
| 10.9 | 30% | 19 |
| 13.6 | 40% | 20 |
| 18.4 | 60% | 20 |

EXAMPLE 10

This example illustrates the use of corrugating adhesives of this invention in the actual manufacturing process for producing corrugated board. This example also illustrates the effect of an additional thermosetting resin on the water resistance of the adhesive bonds produced.

The formulations of the adhesives were as follows:

| Ingredient | Adhesive Sample I | II | III |
| --- | --- | --- | --- |
| Water (g.) | 2385 | 2385 | 2385 |
| Guar Gum (g.) | 14 | 14 | 14 |
| Defoamer (g.) | 1.5 | 1.5 | 1.5 |
| Latex Polymer A (as is)(g.) | 1990 | 1990 | 1990 |
| Corn Starch (g.) | 2375 | 2375 | 2375 |
| Thermosetting Resin* (g.) | 0 | 0 | 115 |
| 3% Aqueous NaOH (g.) | 243 | 510 | 500 |
| pH | 10.0 | 12.0 | 12.0 |

*Dacrez ® 81 (aminoplast-ketone aldehyde resin obtained from National Starch and Chemical Corp.)

The adhesives were run on a laboratory corrugator single-face unit to produce a single-faced board. The A-fluted medium had a basis weight of 62 lb./1000 ft.$^2$ (0.302 kg./m.$^2$) and the facing board had a basis weight of 30 lb./1000 ft.$^2$ (0.146 kg./m.$^2$). The boards made from Adhesives I, II, and III were made at machine speeds of 325, 425, and 450 ft. per min. (99, 130, and 137 m./min.), respectively. Both the medium and the facing were passed over rolls heated to an average temperature of 177° C. In addition to being preheated in the aforementioned manner, the medium was impinged with steam to facilitate fluting. The samples were conditioned and evaluated according to Example 4.

In a separate evaluation, samples of board produced were cut into 2×4 inch pieces and placed in a chamber maintained at about 32° C. and 90% relative humidity for 5 days, to simulate the hot, humid environment of corrugated board in a stacked load. The board samples were thereafter soaked in water at 22° C. for 24 hours then evaluated by the wet pin adhesion test. The results are indicated in Table VI:

TABLE VI

| | Wet Pin Adhesion (lbs./8 in.$^2$) | |
| --- | --- | --- |
| Adhesive | (22° C., 50% R.H.) | (32° C., 90% R.H.) |
| I | 9 | 11 |
| II | 17 | 22 |
| III | 28 | 35 |

EXAMPLE 11

It is an important property of water resistant adhesives to remain substantially uncrosslinked prior to application and heating in the corrugating process. Premature crosslinking of the raw starch in the adhesive, which usually occurs within the first 24 hours after preparation, results in decreased water resistance and decreased combining speeds.

The adhesives of the present invention are characterized by virtually no premature crosslinking of the raw starch and little or no loss in water resistance over that period of time. The following procedure was used to demonstrate the stability of a representative corrugating adhesive of this invention.

An adhesive was prepared as in Example 5 with Latex Polymer J. Fresh and aged samples of the adhesive were evaluated by Brabender viscosity over a time-temperature relationship as follows: A stock solution containing 1532.6 g. water, 64.3 g sodium hydroxide solution (6.25N), and 403.1 g borax solution (0.1655N) was prepared. A total of 360 g. of this solution was then mixed with 100 g. of the adhesive to be tested. The mixture thus obtained was placed into a Brabender Visco-Amylo-Graph (350 cm.-g. sensitivity cartridge) and heated to 35° C. After 5 minutes of holding at 35° C., the mixture was heated on a rapid heat cycle (approximately 3.5° C. per minute) until 90° C. was reached. The mixture was then held at 90° C. for 30 minutes.

A sample of fresh adhesive (IV, pH 12), that same adhesive after aging 24 hours at 25° C. (V, pH had dropped to 10.8), and Adhesive V adjusted to pH 12 (VI) were evaluated. The results are indicated in Table VII.

TABLE VII

| | Brabender Viscosity Units | | Wet Pin Adhesion |
| --- | --- | --- | --- |
| Adhesive | Peak | After 30 min. | (lbs./8 in.$^2$) |
| IV | 4780 | 3260 | 25 |
| V | 4970 | 3690 | 19 |
| VI | 5020 | 3760 | 30 |

Each adhesive exhibited a sharp increase in viscosity and peaked after an elapsed time between 11.5 and 12.5 minutes. Thereafter, each adhesive exhibited a gradual decrease in viscosity. The increase in viscosity corresponds to the swelling of the starch granules while the decrease in viscosity corresponds to the bursting of the granules. The fact that the peak viscosities are similar for the fresh and the 24-hour aged samples indicates that little or no premature crosslinking of the raw starch had taken place during the aging period. Had substantial crosslinking occurred, no peak viscosity and only a minimal increase in viscosity would have been observed during the heating cycle.

Wet pin adhesion of the samples was also determined as in Example 4 (see Table VII). The water resistance exhibited by the adhesives is also indicative that little premature crosslinking took place during aging.

Summarizing, this invention provides a water-resistant alkaline curing corrugating adhesive and a process for preparing water resistant corrugated paperboard by employing in the adhesive a latex polymer containing a quaternary ammonium halohydrin monomer. Time-consuming stack curing, a requirement of starch-based alkaline curing adhesives containing conventional thermosetting resins, is not necessary in order to obtain water-resistant bonds from the adhesives herein. Also, the corrugating adhesives herein possess stability from premature crosslinking thus enabling the adhesives to be applied some time after formulation without exhibiting a deleterious effect on application running speeds or water resistance.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

We claim:

1. A water-resistant, alkaline curing corrugating adhesive composition comprising:
   A. from about 6–35%, based on total weight of the adhesive, solids basis, of a polymer present in latex form, prepared by polymerizing (a) a halohydrin quaternary ammonium monomer having the formula:

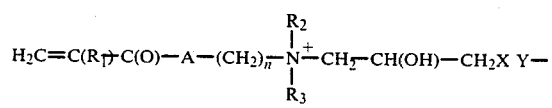

wherein
   $R_1$ is hydrogen or methyl;
   A is —O— or

$R_2$ and $R_3$ are independently $C_1$–$C_6$ alkyl;
   $R_4$ is hydrogen or $C_1$–$C_3$ alkyl;
   X is a halogen;
   Y is an anion; and
   n is 1–4; and
   (b) a vinyl polymerizable monomer;
   B. from about 10–50% based on total weight of the adhesive of a starch component comprising ungelatinized starch or a mixture of ungelatinized and gelatinized starch;
   C. from about 40–80%, based on total weight of the adhesive, of water; and
   D. sufficient alkali to provide the adhesive with a pH of about 7.5 to 13.

2. The corrugating adhesive of claim 1, wherein the starch component consists of ungelatinized and gelatinized starch selected from the group consisting of corn, high amylose corn, and tapioca starch and mixtures thereof in an amount of from 25 to 50%.

3. The corrugating adhesive of claim 2, further comprising a tackifying amount of borax.

4. The corrugating adhesive of claim 1, wherein the starch component consists of ungelatinized starch in an amount of from 10–30%.

5. The corrugating adhesive of claim 4, further comprising a thickener selected from the group consisting of hydroxyethyl cellulose, guar, inorganic colloidal clay, alginate, polyvinyl alcohol and an ethylene oxide polymer.

6. The corrugating adhesive of claim 1, further comprising a thermosetting resin selected from the group consisting of a ketone-formaldehyde, melamine-formaldehyde, and urea-formaldehyde resin.

7. The corrugating adhesive of claim 1, wherein the halohydrin quaternary ammonium monomer is an ester wherein A is —O—.

8. The corrugating adhesive of claim 1, wherein the halohydrin quaternary ammonium monomer is an amide wherein A is

9. The corrugating adhesive of claim 8, wherein the halohydrin quaternary ammonium monomer is the reaction product of epichlorohydrin and dimethylaminopropyl methacrylamide.

10. The corrugating adhesive of claim 9, wherein the halohydrin quaternary ammonium monomer has the formula

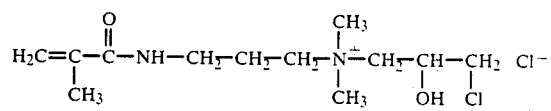

11. The corrugating adhesive of claim 1, wherein the latex polymer comprises 0.5–10%, by weight, of the halohydrin quaternary ammonium monomer and 90–99.5%, by weight, of the vinyl polymerizable monomer.

12. The corrugating adhesive of claim 11, wherein the latex polymer comprises 1–4% of the halohydrin quaternary ammonium monomer.

13. The corrugating adhesive of claim 11, wherein the vinyl polymerizable monomer is selected from the group consisting of ethyl acrylate, 2-ethylhexyl acrylate, methyl methacrylate, styrene, butyl acrylate, vinyl acetate and mixtures thereof.

14. A corrugated paperboard product prepared employing the adhesive composition of claim 1.

15. A process for preparing corrugated paperboard comprising the steps of:
(1) applying to the tips of the corrugations of a fluted paper strip a water-resistant, alkaline curing corrugating adhesive composition comprising:
   A. from about 6–35%, based on total weight of the adhesive, solids basis, of a polymer present in latex form, prepared by polymerizing (a) a halohydrin quaternary ammonium monomer having the formula

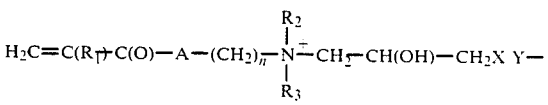

wherein $R_1$ is hydrogen or methyl;
A is —O— or

$R_2$ and $R_3$ are independently $C_1$–$C_6$ alkyl;
$R_4$ is hydrogen or $C_1$–$C_3$ alkyl;
X is a halogen;
Y is an anion; and
n is 1–4; and
(b) a vinyl polymerizable monomer;
B. from about 10–50%, based on total weight of the adhesive, of a starch component comprising ungelatinized starch or a mixture of gelatinized and ungelatinized starch;
C. from about 40–80%, based on total weight of the adhesive, of water; and
D. sufficient alkali to provide the adhesive with a pH of about 7.5 to 13; and
(2) applying a facing to the adhesive-coated tips of said fluted paper strip to form an adhesive bond.

16. The process of claim 15, wherein the latex polymer of the adhesive comprises 0.5–10%, by weight, of the halohydrin quaternary ammonium monomer and 90–99.5%, by weight, of the vinyl polymerizable monomer.

17. The process of claim 16, wherein the halohydrin quaternary ammonium monomer of the latex polymer is an amide where A is

18. The process of claim 17, wherein the latex polymer comprises 1–4% of the halohydrin quaternary ammonium monomer having the formula

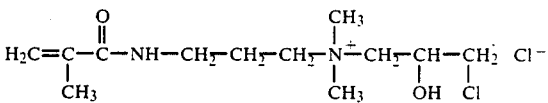

19. The process of claim 15, wherein the corrugating adhesive has a pH of at least 10.

* * * * *